US006690783B2

(12) United States Patent
Creamer et al.

(10) Patent No.: US 6,690,783 B2
(45) Date of Patent: Feb. 10, 2004

(54) SERVICE APPLICATION ARCHITECTURE FOR INTEGRATED NETWORK SERVICE PROVIDERS

(75) Inventors: Thomas E. Creamer, Boca Raton, FL (US); Samuel Kallner, Yaakov (IL); Victor S. Moore, Boynton Beach, FL (US); Gal Shachor, Yokneam (IL); Pnina Vortman, Haifa (IL); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 09/884,578

(22) Filed: Jun. 18, 2001

(65) Prior Publication Data

US 2002/0191774 A1 Dec. 19, 2002

(51) Int. Cl.[7] .......................... H04M 3/42; H04M 7/00; G06F 9/46
(52) U.S. Cl. ..................... 379/201.12; 379/221.08; 709/250; 709/328; 370/469
(58) Field of Search .................. 370/259, 469; 379/201.01, 201.02, 201.03, 201.05, 201.12, 221.08, 221.09, 221.15; 709/202, 203, 223, 224, 226, 229, 250, 318, 328

(56) References Cited

U.S. PATENT DOCUMENTS

| | | | | |
|---|---|---|---|---|
| 5,568,487 | A | | 10/1996 | Sitbon et al. ................. 370/466 |
| 5,991,402 | A | | 11/1999 | Jia et al. .......................... 705/59 |
| 6,363,411 | B1 | * | 3/2002 | Dugan et al. ................. 709/202 |
| 6,393,481 | B1 | * | 5/2002 | Deo et al. ..................... 709/224 |
| 6,425,005 | B1 | * | 7/2002 | Dugan et al. ................. 709/223 |

OTHER PUBLICATIONS

T. Spitaer, aDBMS, *Component Architectures*, (Aug. 1997).
W. Seigneur, *The Open Architecture Distributed Switching Model, Building the Network Operating System for the Information Superhighway*, SONeTech, Inc, (Mar. 2001).
Keijzer, et al., *JAIN: A New Approach to Services in Communication Networks*, pp. 94–99, IEEE Communications Magazine, (Jan. 2000).
Jain, et al., *Java Cell Control, Coordination, and Transactions*, pp. 108–114, IEEE Communications Magazine, (Jan. 2000).
Beddus, et al., *Opening Up Networks with JAIN Parlay*, pp. 136–143, IEEE Communications Magazine, (Apr. 2000).
Bhat, et al., *JAIN Protocol APIs*, pp. 100–107, IEEE Communications Magazine, (Jan. 2000).
S. Silberstang, *Service Creation for Advanced Inteligent Networks Utilizing Intelligent Peripherals*, (Mar. 2001).
Keijzer, et al., *The Telephony Interoperability Challenge*, Sun Journal, (Mar. 2001).
JAIN™: *Integrated Network APIs for the JAVA™ Platform*, (Sep. 2000).
JAIN™ SCE/SLEE API Specification, (Mar. 2001).

* cited by examiner

*Primary Examiner*—Harry S. Hong
(74) *Attorney, Agent, or Firm*—Akerman Senterfitt

(57) ABSTRACT

An application execution environment for an intelligent network, having a protocol layer, application layer and service logic layer. The application execution environment includes a service logic execution environment (SLEE) in the service logic layer. Notably, the SLEE can be a JAIN-compliant SLEE. The SLEE can include an event routing bus for routing events between service components in the service logic layer and client components in the protocol layer and application layer. The application execution environment also can include at least one client component in the protocol layer, wherein the at least one client component is communicatively linked to the SLEE through a connector/wrapper interface. Finally, the application execution environment can include at least one telephony service component executing in the SLEE, wherein the telephony component can be configured to communicate with client components in the protocol layer and other service components in the service logic layer through the event routing bus in the SLEE.

18 Claims, 5 Drawing Sheets

SERVICE APPLICATION ARCHITECTURE FOR INTEGRATED NETWORK SERVICE PROVIDERS

BACKGROUND OF THE INVENTION

1. Technical Field

This invention relates to the field of advanced intelligent networks and more particularly to a service application architecture for integrated network service providers.

2. Description of the Related Art

The development of the open network application programming interface (API) represents an important departure from traditional methods for opening the architecture of the public switched telephone network (PSTN). One such open network API, the Advanced Intelligent Network (AIN) API and architecture, defines a call model which allows the creation of telecommunications service applications outside of the switch environment. Telecommunications service applications are a' la carte telecommunications applications which can perform enhanced services for a telecommunications session established among two or more parties. Exemplary services applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications developed to the AIN specification are written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that in software and information technology in general, with customers reaping the benefits of increased competition, reduced time to market, and the rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. Java APIs for Integrated Networks (JAIN) fulfills the requirements of the new service application component development paradigm. Presently, JAIN includes standard, open, published Java APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. Though only TCAP, JCC and H.323 protocols 110 are shown, the protocols supported by the JAIN specification are not limited to particular protocols and can include, for example, TCAP, ISUP, INAP, MAP, SIP, MGCP, and H.323. Moreover, the JAIN implementation can include an interface to a connectivity management and call control protocol such as JCC.

In addition to the protocol layer 102, the conventional JAIN implementation also can include an application layer 104 for handling secure network access and other external services 120. Also, the conventional JAIN implementation can include a service logic layer 106 which can include a service creation and carrier grade service logic execution environment (SLEE) 108. Service components 112 are the core JAIN components and can execute in the SLEE 108. More particularly, service components 112 can implement telephony and network services and can be constructed according to a standard component model. Instantiations of service component assemblies execute in coordination with the SLEE 108.

In operation, using information regarding the protocol layer 102 which can be incorporated into the SLEE 108, service components 112 can interact with an underlying protocol stack 110 without having specific knowledge of the protocol stack 110. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony and/or network services. Notably, the SLEE 110 can be communicatively linked directly to client components such as external applications 116, protocol stacks 110 and service components 112.

For example, service components 112 executing at the service logic layer 106 in the SLEE 108 can communicate with protocol stacks 110 in the protocol layer through protocol adapters in the SLEE 108. Protocol adapters typically can include class methods, callbacks, encapsulating interfaces, or event handlers. In many cases, an underlying protocol stack 110 can directly communicate with the SLEE 108 through an event table 114 in the SLEE 108 which can be configured to specifically handle events which are particular to the underlying protocol stack 110. In consequence, the SLEE 108 can recognize those particular events, and upon receipt of such an event from the underlying protocol stack 110, the SLEE 108 can pass the event to a subscribing service component 112. Also, service components 112 can be individually programmed to interact with specific external services 120, such as relational databases, directory services, etc.

Despite the apparent advantages of the JAIN specification, however, conventional implementations of the JAIN specification include some drawbacks. particularly in their application to real-time telephony. First, the SLEE of conventional JAIN implementations incorporate an Enterprise Javabean® (EJB) approach which includes unnecessary system housekeeping chores, for example lifecycle responsibilities. Lifecycle responsibilities, however, are not as critical in the real-time telephony domain as they are in other communications domains. Thus, the use of EJBs can introduce too many latencies to satisfy the demands of real time operations. More importantly, in order to relieve service components of the complexities of the protocol stacks, conventional SLEEs require specific knowledge of the underlying protocol layer.

For instance, to communicate with the protocol stacks in the protocol layer, the SLEE requires specific knowledge of the underlying protocol stacks as will be apparent from corresponding event tables which can be used to facilitate communications between the SLEE and an underlying protocol stack. Including specific client component information in the SLEE, however, can add unnecessary complexity to the SLEE. From a life-cycle maintenance perspective this can be problematic. Also, including client component information in the SLEE unnecessarily directly binds the SLEE to particular client components. Finally, directly binding the SLEE to particular client components can require the positioning of the application layer, protocol layer and the service logic layer in close computing proximity to one another. Hence, what is needed is a more flexible service application architecture for integrated network service providers.

SUMMARY OF THE INVENTION

The present invention is a flexible service application architecture for integrated network service providers. The present invention solves the deficiencies of the prior art by providing more direct processing of events by the service components and by reducing protocol stack specific code contained in the service logic execution environment (SLEE). Additionally, the present invention can solve the deficiencies of the prior art by removing specific client component information from the SLEE and substituting therefor a connector/wrapper communications interface. As a result, the SLEE can generically transmit and receive communications through the connector/wrapper interface regardless of the implementation details of the underlying client components. Hence, in accordance with the inventive arrangements, the complexity of the SLEE can be reduced. Moreover, a SLEE configured in accordance with the inventive arrangements need not be directly bound to particular client components.

Finally, the architecture of the present invention can include generic service components which can be configured to communicate with specific external services while providing a generic interface to other service components executing in the SLEE. In this way, service components executing in the SLEE, for example telephony service components, can generically request external services such as database operations from the generic service component. Responsive to receiving a generic request for an external service, the generic service component can invoke one or more functions specific to a corresponding specific external service in order to provide the requested external service to the requesting telephony service component. Consequently, telephony service components need not incorporate specific code directed to a specific external service. Rather, only the generic service component need incorporate specific code directed to the specific external service. Thus, the complexity of the telephony service components can be reduced.

An application execution environment for an intelligent network having a protocol layer, service logic layer and an application layer, which has been configured in accordance with the inventive arrangements can include a SLEE in the service logic layer. Notably, the SLEE can be a JAIN-compliant SLEE. The SLEE can include an event routing bus for routing events between service components in the service logic layer and client components in the protocol layer and application layer. Importantly, the client components can include a protocol stack. Furthermore, the client component can include call-control components, signaling protocol components, connectivity management protocol components, and secure network access protocol components.

The application execution environment also can include at least one client component in the protocol layer, wherein the at least one client component is communicatively linked to the SLEE through a connector/wrapper interface. Finally, the application execution environment can include at least one telephony service component executing in the SLEE, wherein the telephony component can be configured to communicate with client components in the protocol layer and other service components in the service logic layer through the event routing bus in the SLEE. The application execution environment can also include at least one generic service component executing in the SLEE. The generic service component can be configured to communicate with other service components in the SLEE. The generic service component also can be configured to communicated with specific external services in the application layer.

The connector/wrapper interface can include a client component wrapper, the client component wrapper providing an abstracted interface to a client component in the protocol layer; and, a connector associated with the SLEE, the connector corresponding to the client component wrapper, wherein the connector is configured to communicate with the client component through the abstracted interface provided by the client component wrapper. Additionally, the application execution environment can include a SLEE descriptor, the SLEE descriptor specifying at least one client component with which the SLEE can be configured to communicate through a connector/wrapper interface. Similarly, the application execution environment can include at least one client component descriptor, each client component descriptor corresponding to a specific client component in the protocol layer, the at least one client component descriptor specifying particular events for which the specific client component can be notified by the event routing bus in the SLEE.

A telephony services provisioning method in accordance with the inventive arrangements can include the following steps performed partially in an event routin bus in a SLEE, and partially in a service component. First, in an event routing bus in a service logic execution environment (SLEE), protocol layer events can be received from client components through a connector/interface wrapper. Also, service logic layer events can be received from service components executing in the SLEE. Finally, the particular protocol layer events and the service logic layer events can be forwarded to service components and client components registered to receive the particular protocol layer and service logic layer events.

Second, in at least one of the service components executing in the SLEE, at least one service logic layer event can be posted to the event routing bus, wherein the event routing bus can forward the posted service logic layer event to another service component registered to receive the posted service logic layer event. Notably, in at least one of the service components, a communications link can be established with a specific external service; a service logic layer event can be received from another service component, the received event requesting an external service; and, responsive to receiving the service logic layer event from another service component, the requested external service can be provided through at least one specific call to a function provided by the linked specific external service.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
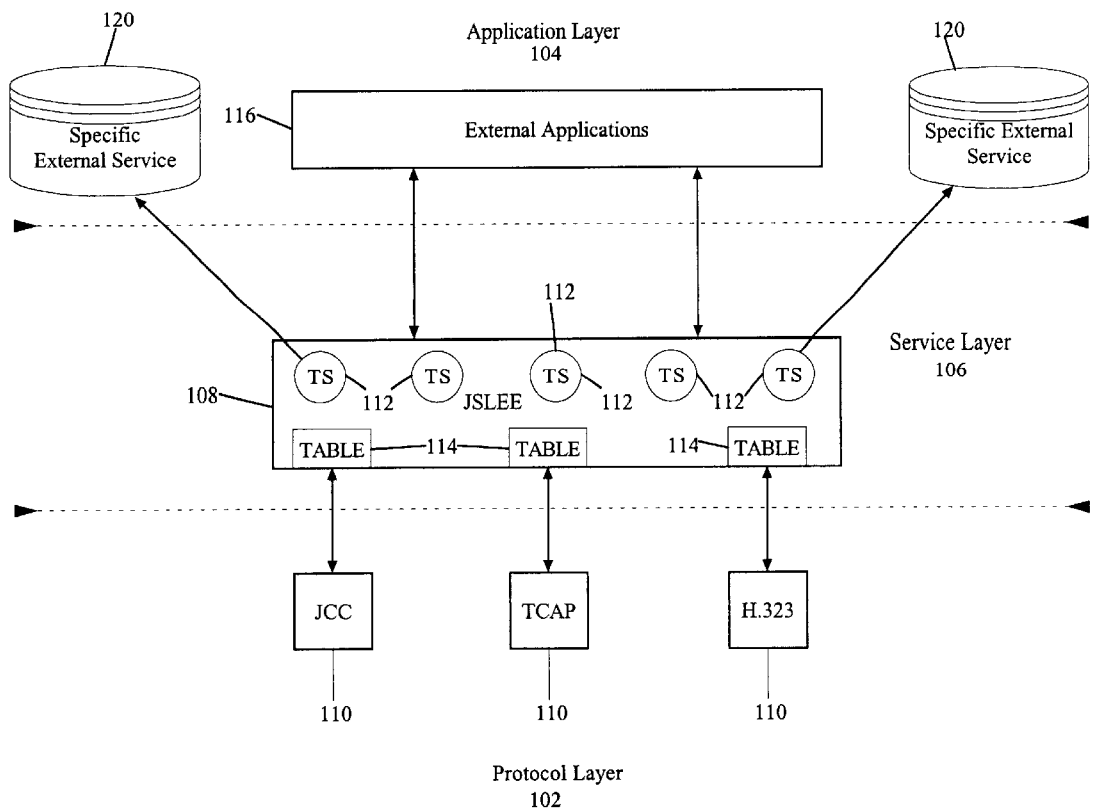
FIG. 1 is a schematic representation of an intelligent network architecture configured in accordance with a conventional JAIN implementation known in the prior art.

The present invention is a flexible service application architecture for integrated network service providers. The architecture can be similar to an advanced intelligent network architecture (AIN) inasmuch as the architecture can have a protocol layer, service logic layer and an application layer. In accordance with the inventive arrangements, the architecture of the present invention can include a service logic execution environment (SLEE) in the service logic layer. Notably, the SLEE can be a JAIN-compliant SLEE. The SLEE can include an event routing bus for routing events between service components in the service logic layer and client components in the protocol layer and application layer. In particular, telephony service components executing in the SLEE can be configured to communicate with client components in the protocol layer and other service components in the service logic layer through the event routing bus in the SLEE. Finally, client components can be communicatively linked to the SLEE through a connector/wrapper interface.

The incorporation of a SLEE configured in accordance with the inventive arrangements can help to solve the deficiencies of the prior art by providing an event routing bus which can facilitate inter-service component event communications. By providing more direct event communications, the inherent latencies associated with the EJB approach of the JAIN specification can be reduced.

Also, unlike conventional implementations of a SLEE in which service components only can receive and process events received from a client component such as a protocol stack via the SLEE, in the present invention, service components also can receive and process events from other service components. Thus, advanced combinations of service components can be created to form macro service components.

The architecture of the present invention also can include a connector/wrapper interface for communicatively linking the SLEE to client components in the protocol layer. The connector/wrapper interface between the SLEE and client components in the protocol layer also can help to solve the deficiencies of the prior art by providing a configurable connection through a generic interface to a specific client component without inflexibly binding the client component to the SLEE. Unlike conventional implementations of a SLEE in which the SLEE is directly bound to client components with which the SLEE communicates, in the present invention, the SLEE and client component need not be positioned proximately to one another. Rather, the SLEE and client component can be positioned across a network, if need be. In this way, a more flexible association between client component and SLEE is possible which can facilitate the maintenance and enhancement of the SLEE during life-cycle maintenance. Moreover, the specific knowledge of a particular client component can be removed from the SLEE and included, instead in the interface to the client component. As a result, the complexity of the SLEE can be reduced.

Finally, the architecture of the present invention can include generic service components for providing an abstracted interface to a specific external services. More particularly, while each generic service component can maintain an awareness of a particular implementation of a specific external service, other service components, particularly telephony service components executing in the SLEE, can generically request external services of the generic service component without knowing the particular implementation of a corresponding specific external service. In this way, the complexity of service components can be reduced and the service components can be de-coupled from specific implementations of external services.

Figure 2:
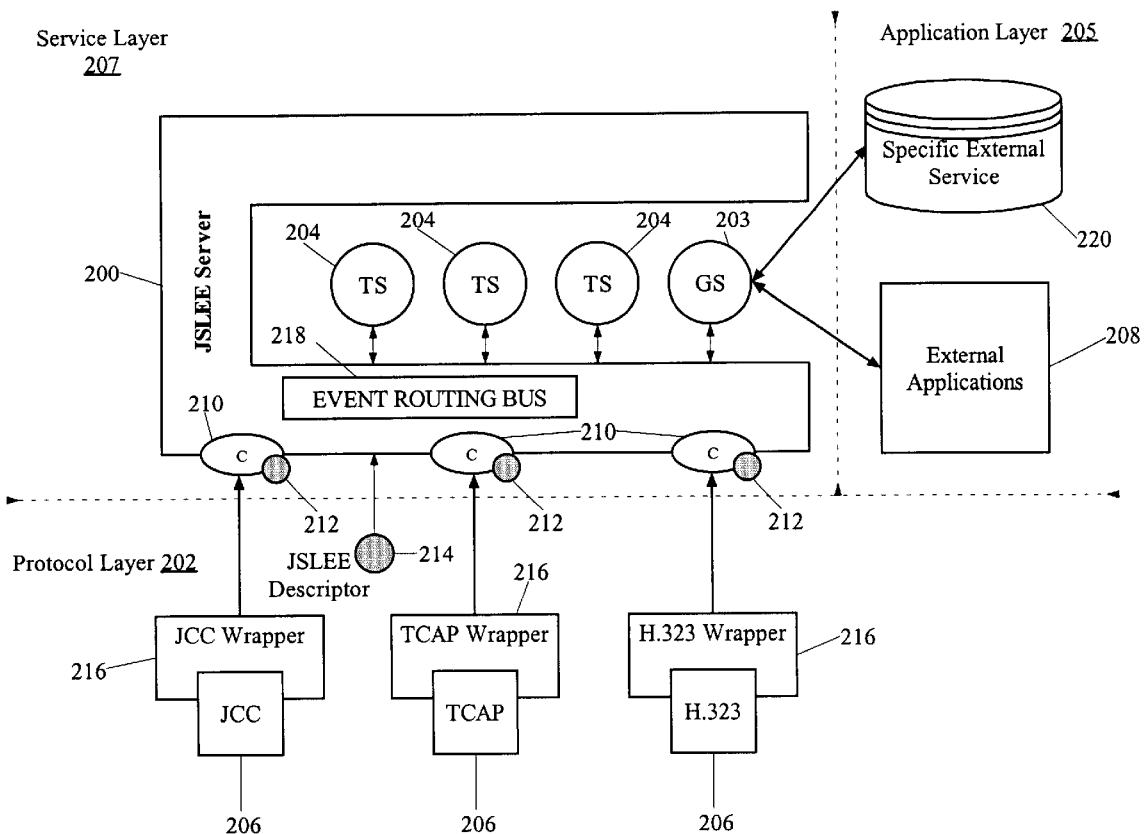
FIG. 2 is a schematic representation of an intelligent network architecture including a service logic execution environment (SLEE) configured in accordance with the inventive arrangements.

FIG. 2 is a schematic illustration of a JAIN-compliant intelligent network configured in accordance with the inventive arrangements. A JAIN-compliant network configured in accordance with the inventive arrangements can include a protocol layer 202, an application layer 205 and a service logic layer 207. The application layer 205 can host external third party applications 208. Typical third party applications 208 can suit mass-market demand for services such as virtual private networks (VPNs), inbound services and unified messaging. External third party applications 208 also can include short-lived and niche applications which can be deployed using un-trusted application space deployment technologies such as database lookup interfaces, downloadable mechanisms, and the Parlay API, as are well known in the art. Finally, specific external services 220, such as database services, directory services and wireless services, can be included in the application layer 205. The service logic layer 207 can include a SLEE server such as a JSLEE Server 200 which can be configured for compatibility with the JAIN specification. Finally, the protocol layer 202 can include one or more protocol stacks 206 which can be configured to interact with service components 202 executing in the JSLEE Server 200. Notably, although FIG. 2 only depicts three protocol stacks 206, the invention is not limited in regard to the number or type of protocol stacks 206.

Rather, JSLEE Server 200 can interact with any protocol stack, for example those protocol stacks configured in accordance with the JAIN specification.

In operation, the JSLEE Server 200 can transmit and receive events to and from the protocol stacks 206 in the protocol layer 202. More particularly, the events can be transmitted and received in the event routing bus 218 included in the JSLEE Server 200. Telephony service components 204 and generic service components 203 can register as listeners for particular events received in the event routing bus 218. Service components 203, 204 which are registered with the JSLEE Server 200 can receive protocol stack events directed towards particular ones of the service components 203, 204. Also, service components 203, 204 can receive service component events directed towards particular ones of the service components 203, 204. More specifically, the event routing bus 218 of the JSLEE Server 200 can route received events to service components 203, 204 which have registered with the JSLEE Server 200 to receive such events.

Figure 3:
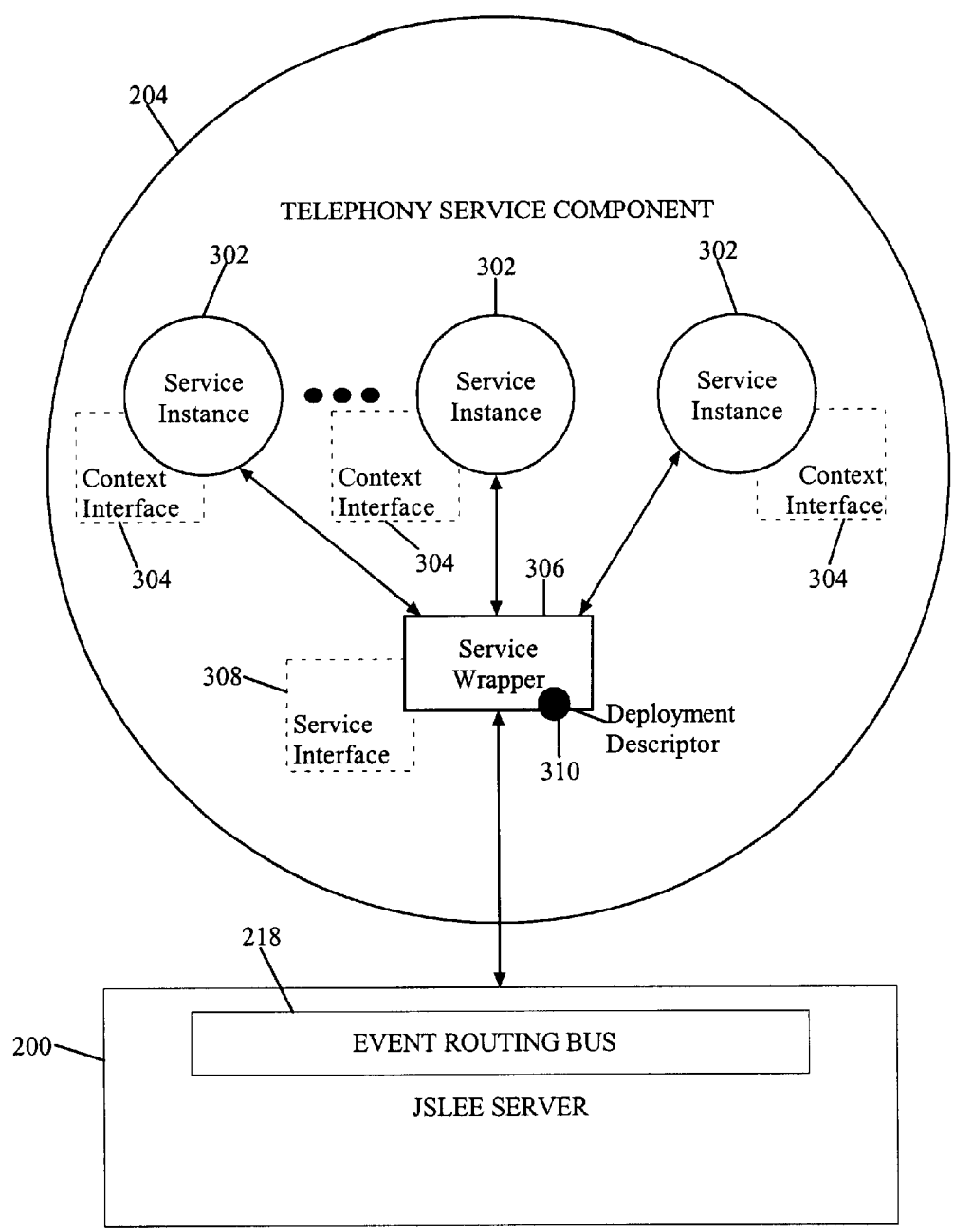
FIG. 3 is a detailed illustration of a telephony service component configured for execution in the SLEE of FIG. 2.

FIG. 3 is a schematic representation of a service component 202 configured for use in the JSLEE Server 200 of FIG. 2. As shown in FIG. 3, the service component 202 can include one or more service instances 302. Service instances 302 are individually instantiated services which can execute in the JSLEE 200. More importantly, each service instance 302 can register with the event routing bus 204 to receive and transmit events to the protocol layer 202 as well as other service components 202. Each service instance 302 can be accessed through service wrapper 306 which insulates the details of the service instance implementation. More particularly, data and method members of the service class can be accessed through a common interface contained in the service wrapper 306.

A deployment descriptor 310 also can be provided. The deployment descriptor 310 can be a document, for instance an XML document, which can describe proper parameters for initially loading an instance of the service component 302 in the JSLEE Server 200. Notably, an interface to the service wrapper 306 can be published to external objects through a service interface 308 which can be included as part of an XML document, for example. Likewise, an interface to each service instance 302 can be included as part of a context interface 304, which also can be published as part of an XML document, for example. Once loaded, service instances 302 can communicate via the event routing bus 204 in the JSLEE Server 200.

To avoid including code in the telephony service components 204 for accessing specific external services 220 such as proprietary and relational database services and directory services, generic service components 203 can be incorporated in the architecture of the present invention. Generic service components 203 can provide an abstracted interface to specific external services 220 and can respond specifically to generic requests from other service components 203, 204 to interact with the specific external services 220. Hence, the inclusion of generic service components 203 can relieve other service components, particularly telephony service components 204, from incorporating a specific configuration for communicating with specific external services 220.

Figure 4:
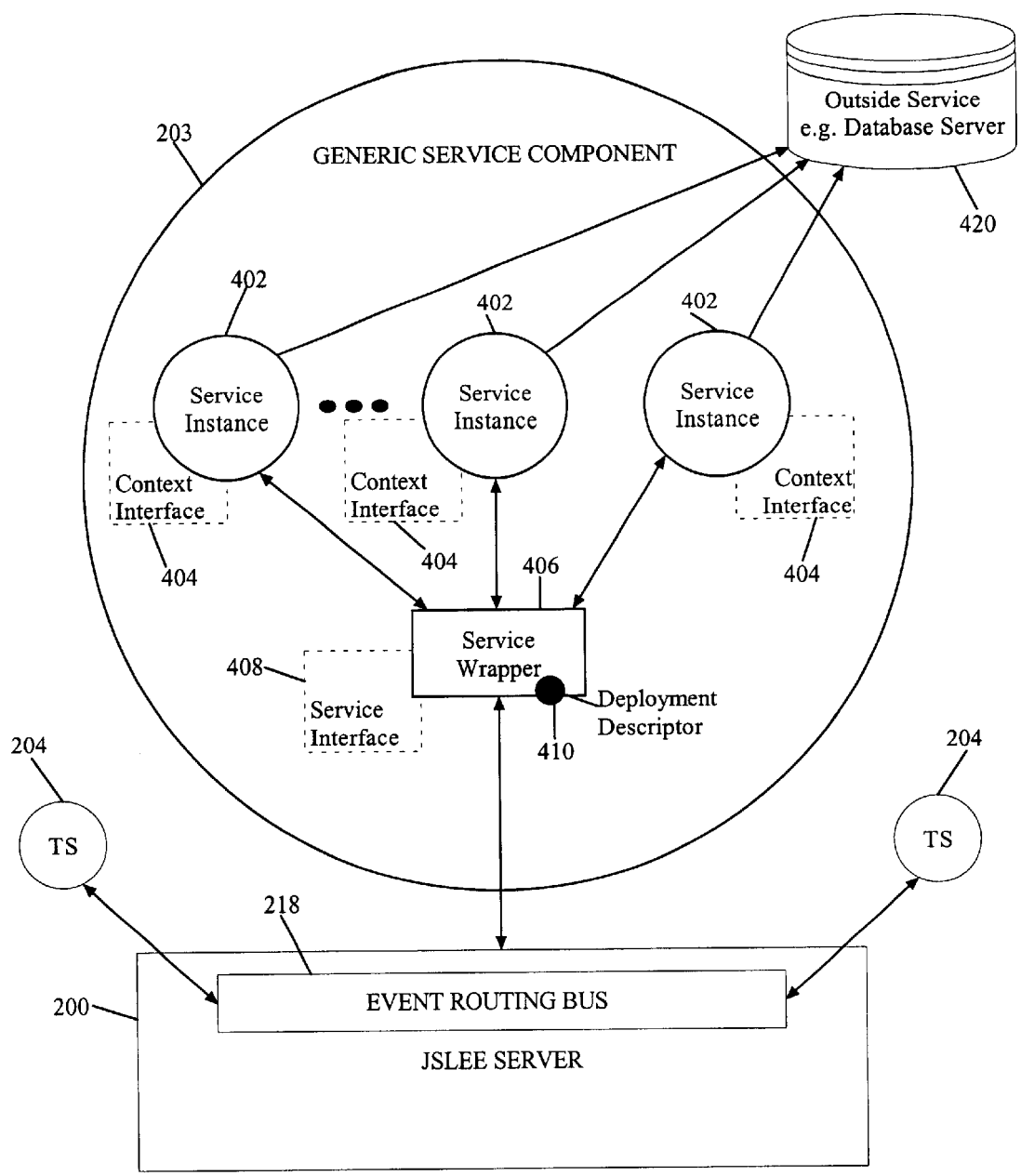
FIG. 4 is a detailed illustration of a generic service component configured for execution in the SLEE of FIG. 2.

FIG. 4 is a schematic representation of a generic service component 203 configured for use in the JSLEE Server 200 of FIG. 2. As shown in FIG. 4, the generic service component 203 can include one or more generic service instances 402. Like the telephony service instances 302 of FIG. 3, the generic service instances 402 of FIG. 4 are individually instantiated generic services which can execute in the JSLEE 200. More importantly, each generic service instance 402 can register with the event routing bus 218 to receive and transmit events to and from other service components 203, 204 in the service logic layer 207. As in the case of the telephony service component 204, each generic service instance 402 can be accessed through generic service wrapper 406 which insulates the details of the service instance implementation. More particularly, data and method members of the service class can be accessed through a common interface contained in the generic service wrapper 406.

A deployment descriptor 410 also can be provided. The deployment descriptor 410 can be a document, for instance an XML document, which can describe proper parameters for initially loading an instance of the generic service component 402 in the JSLEE Server 200. Notably, an interface to the generic service wrapper 406 can be published to external objects through a generic service interface 408 which can be included as part of an XML document, for example. Likewise, an interface to each service instance 402 can be included as part of a context interface 404, which also can be published as part of an XML document, for example. Once loaded, generic service instances 402 can communicate via the event routing bus 204 in the JSLEE Server 200.

Returning now to FIG. 2, in accordance with the inventive arrangements, the JSLEE Server 200 can be configured to communicate with client components in the JAIN-compliant intelligent network. Client components can include not only the protocol stacks 206, but also other service components 203, 204, specific external services 220, and external applications 208. Importantly, the JSLEE Server 200 can be so configured without having specific knowledge of the implementation of each client component. To accomplish this feat, the JSLEE Server 200 can include connectors 210 which can communicate with wrappers 216 thereby forming a connector/wrapper interface. The wrapper 216 can provide to the connector 210 an abstracted interface for a specific client component such as the protocol stack 206. Each connector 210, in turn, can be configured to communicate with a corresponding client component such as a protocol stack 206 through the abstracted interface provided by the corresponding wrapper 216.

Thus, in general, the JSLEE Server 200 can generically transmit and receive events through the connector/wrapper interface regardless of the implementation details of the underlying client components such as protocol stacks 206. Rather, only the wrapper 216 requires specific knowledge of the implementation details of the underlying protocol stack 206. In one aspect of the present invention, a JSLEE descriptor 214 can be included which can specify individual wrappers 216 with which corresponding connectors 210 can be configured to communicate. In particular, the JSLEE Server 200, at start-up, can read the JSLEE descriptor 214 to learn the identity of each specified wrapper 216. Subsequently, the JSLEE Server 200 can configure connectors 210 to communicate with the specified wrappers 216. Similarly, client component descriptors 212 can be provided for each connector 210. The client component descriptors 212 can specify particular events for which an associated client component such as a protocol stack 206 can be notified by the event routing bus 218 of the JSLEE Server 200.

Figure 5:
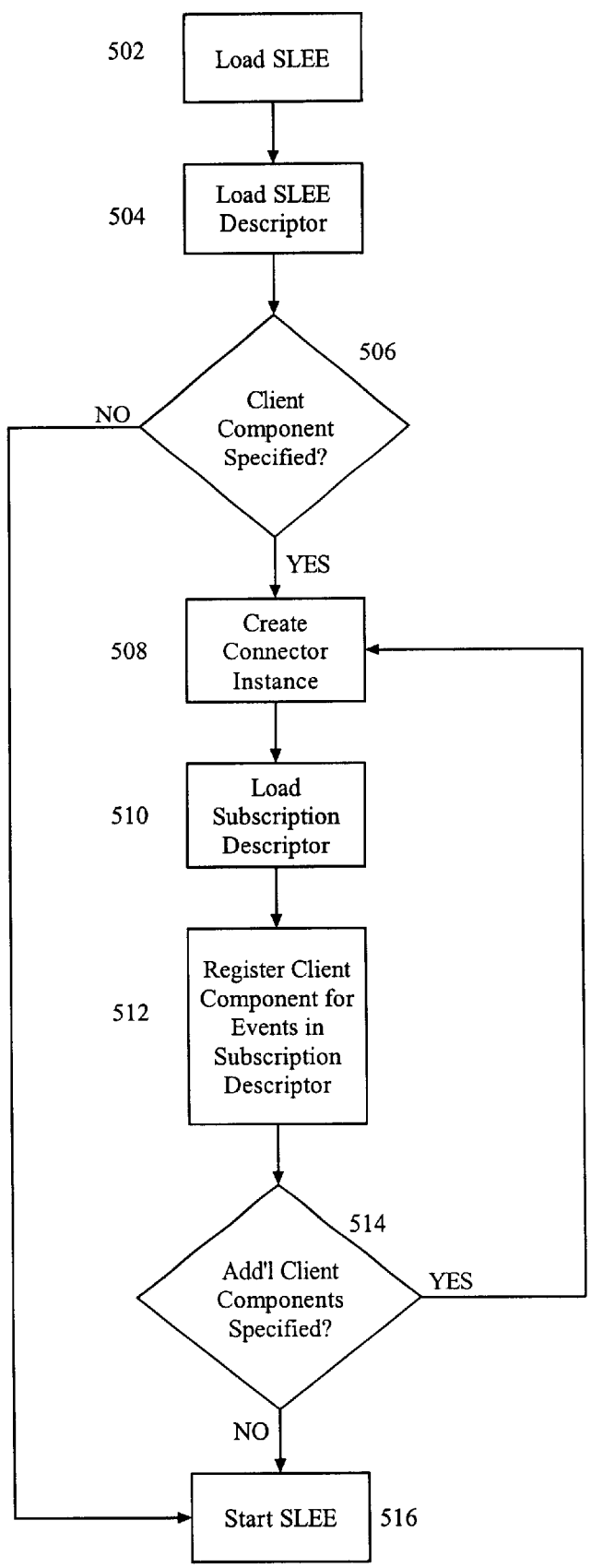
FIG. 5 is a flow chart illustrating a method for establishing a communications link between a client component and the SLEE of FIG. 2 through a connector/wrapper interface.

FIG. 5 is a flow chart which illustrates a method of communicatively linking a SLEE to a client component in an application execution environment of an integrated network. The method can begin in block 502 in which the SLEE can be loaded. In block 504, a SLEE descriptor can be loaded. If, in decision block 506 a client component is specified, in block 508 a connector instance can be created and configured to communicate with a wrapper associated with the specified client component. In block 510, a subscription descriptor associated with the configured connector can be loaded and in block 512, the specified client component can be registered with an event handler in the SLEE to receive those events listed in the subscription descriptor.

Subsequently, in decision block 514, if additional client components are listed in the SLEE descriptor, additional connector instances can be created and configured in accordance with blocks 508 through 512. Finally, once all connector instances have been created and configured, the SLEE can be started in step 516 and events can be routed to registered client components through the connector/wrapper interface regardless of the underlying implementation of each individual client component. In consequence, the SLEE can be communicatively linked to client components through client component wrappers without requiring the SLEE to have specific knowledge of each client component.

The present invention can be realized in hardware, software, or a combination of hardware and software. A telephony service provisioning method according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An application execution environment for an intelligent network, said application execution environment having a protocol layer, service logic layer and application layer, said application execution environment comprising:
    a service logic execution environment (SLEE) in the service logic layer, said SLEE comprising an event routing bus for routing events between service components in the service logic layer and client components in the protocol layer and application layer;
    at least one client component in the protocol layer, wherein said at least one client component is communicatively linked to said SLEE through a connector/wrapper interface; and,
    at least one telephony service component executing in said SLEE, said telephony component configured to communicate with client components in the protocol layer and other service components in the service logic layer through said event routing bus in said SLEE.

2. The application execution environment of claim 1, further comprising:
    at least one generic service component executing in said SLEE, wherein said generic service component is configured to communicate with other service components in said SLEE and with specific external services in the application layer.

3. The application execution environment of claim 1, wherein said connector/wrapper interface comprises:
    a client component wrapper, said client component wrapper providing an abstracted interface to a client component in the protocol layer; and,
    a connector associated with said SLEE, said connector corresponding to said client component wrapper, wherein said connector is configured to communicate with said client component through said abstracted interface provided by said client component wrapper.

4. The application execution environment of claim 1, further comprising:
    a SLEE descriptor, said SLEE descriptor specifying at least one client component with which said SLEE can be configured to communicate through a connector/wrapper interface.

5. The application execution environment of claim 1, further comprising:
    at least one client component descriptor, each client component descriptor corresponding to a specific client component in the protocol layer, said at least one client component descriptor specifying particular events for which said specific client component can be notified by said event routing bus in said SLEE.

6. The application execution environment of claim 1, wherein said client component is a protocol stack.

7. The application execution environment of claim 1, wherein said client component is selected from the group consisting of a call-control component, a signaling protocol component, a connectivity management protocol, and a secure network access protocol.

8. The application execution environment of claim 1, wherein said SLEE is a JAIN-compliant SLEE.

9. A telephony services provisioning method comprising the steps of:
    in an event routing bus in a service logic execution environment (SLEE),
    receiving protocol layer events from client components through a connector/interface wrapper,
    receiving service logic layer events from service components executing in said SLEE, and,
    forwarding said particular protocol layer events and said service logic layer events to service components and client components registered to receive said particular protocol layer and service logic layer events; and,
    in at least one of said service components executing in said SLEE,
    posting at least one service logic layer event to said event routing bus, wherein said event routing bus can forward said posted service logic layer event to another service component registered to receive said posted service logic layer event.

10. The telephony service provisioning method of claim 9, further comprising the step of:
    in at least one of said service components, establishing a communications link with a specific external service;

receiving a service logic layer event from another service component, said received event requesting an external service; and, responsive to receiving said service logic layer event from said another service component, providing said requested external service through at least one specific call to a function provided by said linked specific external service.

11. A machine readable storage, having stored thereon a computer program for provisioning telephony services, said computer program having a plurality of code sections executable by a machine for causing the machine to perform the steps of:

in an event routing bus in a service logic execution environment (SLEE), receiving protocol layer events from client components through a connector/interface wrapper, receiving service logic layer events from service components executing in said SLEE, and, forwarding said particular protocol layer events and said service logic layer events to service components and client components registered to receive said particular protocol layer and service logic layer events; and, in at least one of said service components executing in said SLEE, posting at least one service logic layer event to said event routing bus, wherein said event routing bus can forward said posted service logic layer event to another service component registered to receive said posted service logic layer event.

12. The machine readable storage of claim 11, further comprising the step of:

in at least one of said service components, establishing a communications link with a specific external service;

receiving a service logic layer event from another service component, said received event requesting an external service; and, responsive to receiving said service logic layer event from said another service component, providing said requested external service through at least one specific call to a function provided by said linked specific external service.

13. An application execution environment for an intelligent network, said application execution environment having a protocol layer, service logic layer and application layer, said application execution environment comprising:

a service logic execution environment (SLEE) in the service logic layer, said SLEE comprising an event routing bus for routing events between service components in the service logic layer and client components in the protocol layer and application layer;

at least one client component in the protocol layer, wherein said at least one client component is communicatively linked to said SLEE through a connector/wrapper interface, said connector/wrapper interface comprising a client component wrapper, said client component wrapper providing an abstracted interface to a client component in the protocol layer, and, a connector associated with said SLEE, said connector corresponding to said client component wrapper, wherein said connector is configured to communicate with said client component through said abstracted interface provided by said client component wrapper;

at least one telephony service component executing in said SLEE, said telephony component configured to communicate with client components in the protocol layer and other service components in the service logic layer through said event routing bus in said SLEE; and, at least one generic service component executing in said SLEE, wherein said generic service component is configured to communicate with other service components in said SLEE and with specific external services in the application layer.

14. The application execution environment of claim 13, further comprising:

a SLEE descriptor, said SLEE descriptor specifying at least one client component with which said SLEE can be configured to communicate through a connector/wrapper interface.

15. The application execution environment of claim 13, further comprising:

at least one client component descriptor, each client component descriptor corresponding to a specific client component in the protocol layer, said at least one client component descriptor specifying particular events for which said specific client component can be notified by said event routing bus in said SLEE.

16. The application execution environment of claim 13, wherein said client component is a protocol stack.

17. The application execution environment of claim 13, wherein said client component is selected from the group consisting of a call-control component, a signaling protocol component, a connectivity management protocol, and a secure network access protocol.

18. The application execution environment of claim 13, wherein said SLEE is a JAIN-compliant SLEE.

* * * * *